United States Patent [19]
Massey et al.

[11] Patent Number: 6,113,997
[45] Date of Patent: Sep. 5, 2000

[54] PROCESS TO PREPARE A POLYESTER RESIN

[75] Inventors: Freddie Lee Massey, Uniontown; Deborah Ann Snell Tung, Tallmadge; Millicent Louise Martin-Shultz, Brooklyn Heights; Ben Duh, Tallmadge; Charles Louis Kern, Jr., North Canton, all of Ohio

[73] Assignee: Shell Oil Company, Houston, Tex.

[21] Appl. No.: 09/316,347

[22] Filed: May 21, 1999

Related U.S. Application Data

[60] Provisional application No. 60/086,735, May 26, 1998.

[51] Int. Cl.$^7$ .......................... B29D 22/00; C08G 63/16
[52] U.S. Cl. .................. 428/35.7; 528/272; 528/302; 528/308; 528/308.6; 264/209.1; 264/209.6; 264/211.12; 264/239; 264/328.1; 264/330; 428/36.92

[58] Field of Search ........................... 528/272, 302, 528/308, 308.6; 264/209.1, 209.6, 211.12, 239, 328.1, 330; 428/35.7, 36.92

[56] References Cited

U.S. PATENT DOCUMENTS

| | | | |
|---|---|---|---|
| 4,154,920 | 5/1979 | Jabarin | 528/272 |
| 4,340,721 | 7/1982 | Bonnebat et al. | 528/272 |

*Primary Examiner*—Samuel A. Acquah
*Attorney, Agent, or Firm*—Kim Muller

[57] ABSTRACT

A process is disclosed to prepare a polyester resin having a predetermined acetaldehyde (AA) content whereby the IV of the melt phase resin is constrained to a certain range resulting in a longer SSP time to achieve a higher level of IV for the resin with an AA content of 1 PPM or less. The resultant resin can be transformed into a bottle preform, which, when blown, forms a bottle suitable for packaging of mineral water.

15 Claims, 1 Drawing Sheet

PROCESS TO PREPARE A POLYESTER RESIN

This application claims benefit of provisional application Ser. No. 60/086,735 filed May 26, 1998.

FIELD OF THE INVENTION

This invention relates to process for preparing a polyester resin having a low acetaldehyde (AA) content. The resin is useful in packaging of mineral water or other beverages where AA content must be kept below certain predetermined levels.

BACKGROUND OF THE INVENTION

The background of this invention recognizes that AA content in polyester resins is an important factor when the end-use of the resin is concerned. Generally, resin manufacturers wish to produce a resin with as low an AA content as possible within the economics of a continuous commercial process.

In order to manufacture a polyester resin which can be transformed into a preform, the manufacturer is required to solid state polymerize (SSP) the resin to a sufficiently high viscosity index (IV). In order to conduct the solid state process, a pre-polymer or melt phase polymer must first be prepared using certain monomeric materials. The first reaction is sometimes referred to as melt phase polymerization. After such polymer is present in the melt condition, it is extruded, pelletized, and then cooled in a liquid, such as water. These monomeric materials are exemplified in the art by ethylene glycol, terephthalic acid or its ester, and other co-polymeric materials such as other dicarboxylic acids, multi-carboxylic acids, or other diols, triols, or multi-hydroxyl monomers.

However, traditional melt-phase polymerization entrains undesirable products and unreacted monomer components. AA, a noxious by-product of the melt polymerization process, can spoil the flavor and aroma of contained beverages, especially mineral water. Producers of containers for drinking water and soft-drink containers desire an AA content of less that 1 $\mu$g/l, parts per billion (PPB), evolved into the headspace of an empty container. To achieve such a low AA content container, the solid state polymerized resin AA content should not exceed 1 part per million (PPM).

Multi-layer containers can also be used to avoid the problem of by-product AA contamination of drinking water and beverages. Each layer is composed of polymers with specific properties. Such containers are more expensive to make and raise concern with recycle of post consumer containers.

In. U.S. Pat. No. 4,340,721, a polyester is disclosed having a low acetaldehyde content. The intrinsic viscosity of the melt condensate is limited to 0.75 to 0.90 of the maximum possible IV, i.e. of about 0.6 dl/g. It has now been discovered that if the melt condensate is constrained to even a lower IV vis-a-vis the end point IV, the longer time necessary to SSP the polymer results in lower resin incipient AA content. This reduces a significant contributing factor of AA content in a resultant bottle made from a preform. The resultant bottles contain a maximum AA content of 1 $\mu$g/l (PPB).

Finally, in U.S. Pat. No. 4,154,920 a pre-polymer is maintained at 0.1 to 0.3 dl/g prior to SSP. When one starts at this level of IV as the feed material to the SSP, the resin becomes difficult to pelletize.

SUMMARY OF THE INVENTION

This invention provides a process for preparing in commercial quantities co-polyester resins having unique properties by deliberately constraining the melt phase reaction to capture a pre-polymer having an IV of 0.38 dl/g to 0.52 dl/g. The prepolymer is then used as a feed material to the SSP process. This results in a resin (and preform and bottle made therefrom) having a desirable advantageous AA content.

The resin from the SSP process also has a more favorable melt point (MP) for making bottle preforms and an unexpectedly lower rate of AA reformation rate when measured at 280° C. This reformation rate is equal to 70 PPM to 190 PPM AA per hour measured at 280° C. based on ASTM D-4509 at 10, 20, and 30 minutes, respectively, and extrapolated to a one hour time interval. A more preferred range of reformation rate is equal to 100 PPM to 160 PPM AA per hour measured at 280° C. based on the same analytical procedure.

DETAILED DESCRIPTION OF THE INVENTION

This invention relates to a process that allows the preparation of a unique polyester co-polymer resin that allows for low melt temperature processing and concomitant slow rate of AA reformation.

The resin is prepared by a combined melt polymerization/solid state polymerization (SSP) process. This process captures a melt phase polyester resin having a relatively low intrinsic viscosity which is then SSP-ed to a finished IV. This process results in low incipient AA content in the resin bottle preform and its bottle. Such low intrinsic viscosity can be achieved by selecting proper melt phase polymerization conditions in combination with the incorporation of glycols and/or acid co-monomers, with isophthalic acid being the preferred co-monomer. Lower temperature melt extrusion-preform injection molding and reduced shear rate effects combine to reduce AA generation. The resin has properties which combine a low incipient AA content (equal to or less than 1.0 PPM), preferably lower than 0.50 PPM and more, preferably lower than 0.24 PPM, and lower melt processing temperature ($\leq$252° C.) to produce a bottle having a maximum acetaldehyde content of 1 $\mu$g/l (PPB).

In a preferred embodiment, the monomers that may be used in the production of the polyester resin consist of terephthalic acid (TPA), or an ester thereof, and isophthalic acid (IPA), or an ester thereof; and ethylene glycol (EG) and/or diethylene glycol (DEG). The amount of IPA present is equal to 1–10 mole % IPA (based on the total acid component of the resin), while 3.0 mole % to 5.5 mole % IPA is even more preferred and 5 mole % is most preferred; and ethylene glycol and/or diethylene glycol. The preferred concentrations of EG and DEG are respectively 99–95 mole % and 1–5 mole %, with 96.7–97.5 mole % and 2.5–3.3 mole % being more preferred, based on the total diol component of the resin. This composition lowers the initial DSC melting point (MP) of the copolymer to a maximum of 245° C. (473° F.). Other co-monomers, such as naphthalene dicarboxylic acid and/or propylene glycol may also be incorporated into the polyester resin.

Melt extrusion-injection molding of the solid state polymerized resin can be accomplished using an antimony triacetate catalyst followed by a phosphoric acid stabilizer and appropriate color toners. Alternatively, the process may employ a phosphoric acid stabilizer followed by cobalt acetate tetra-hydrate color toner and antimony ethylene glycolate catalyst. Instead of cobalt acetate tetra-hydrate, color toning dyes can be added during the melt polymerization or in the melt extrusion-injection molding step.

This process allows melt extrusion-injection molding processing at temperatures up to 252° C. (486° F.), low enough to reduce AA generation for the production of polyester preforms, yielding containers with AA concentrations of less than or equal to 1.0 μg/l (PPB). This process also allows the resin to maintain properties required for satisfactory container performance.

BRIEF DESCRIPTION OF THE DRAWINGS

The melt phase resin so produced and captured herein has properties that make it uniquely useful for preparation of low AA content containers employing melt processing steps. FIG. 1 shows how resin produced from a 95/5 poly(ethylene terephthalate/isophthalate) (PETI) formulation described herein yields lower initial DSC melting point after SSP than other resin compositions.

Figure 1:
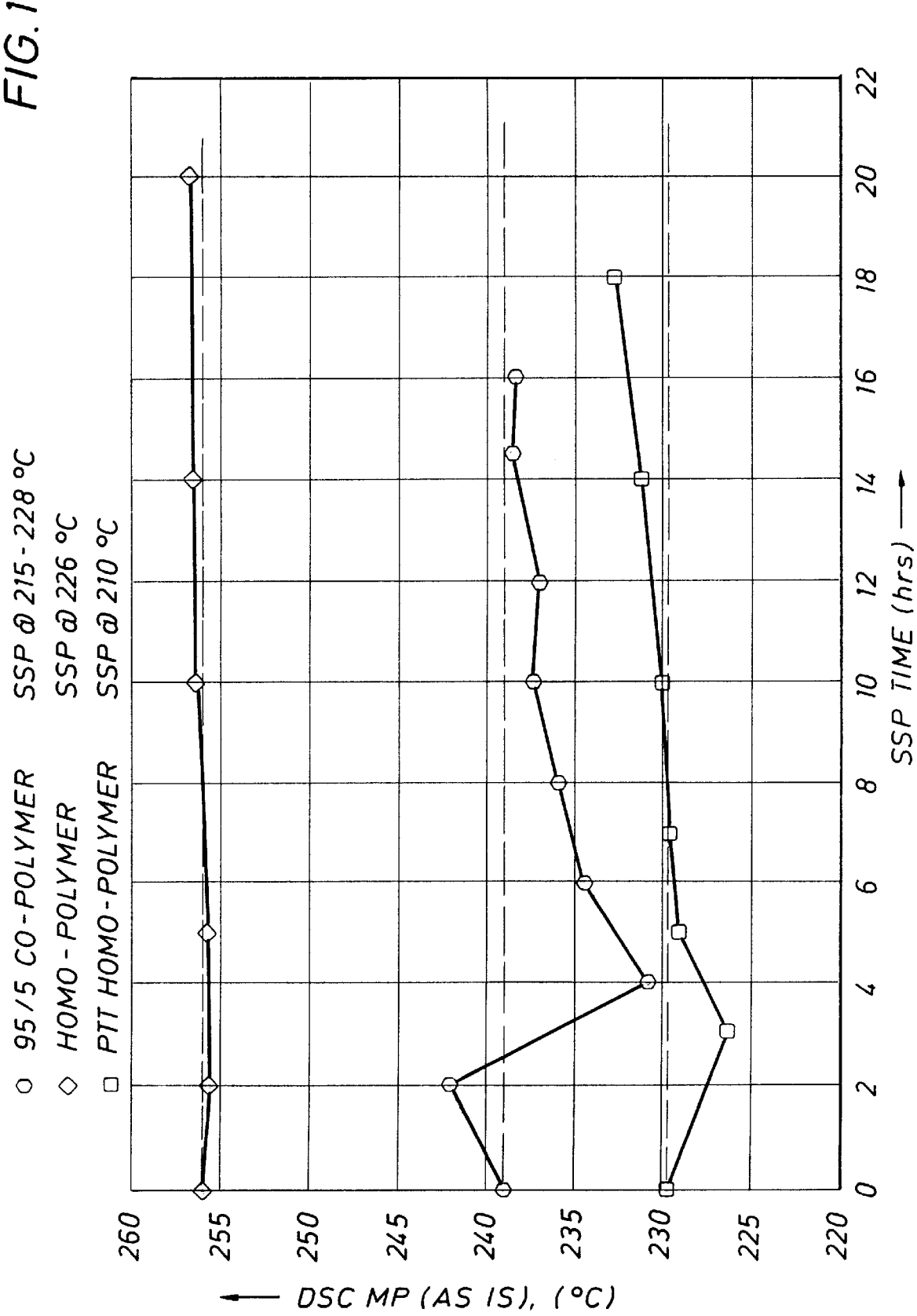
FIG. 1 is a graph showing initial DSC melting points after SSP.

The DSC melting point behavior of a normal PET resin shows a drop in the melting point after initial melting. Thereafter, the melting point increases. Eventually, the measured DSC melting point exceeds the melting point at the beginning of SSP. The resin of the present invention shows a drop in the DSC melting point after the initial SSP sample. While the melting point increases thereafter, the melting point of the resin does not rise above the initial melting point on prolonged heating.

The effect of the lower temperature melt point is not present in homopolymers. Without a co-monomer present, the melting point rapidly exceeds the initial melting point raising the melt process temperature requirement. Thus, addition of the co-monomer suppresses the melt point increases over the initial melt point, resulting in lower melt process temperature requirements. The resulting resin has a lower AA generation rate and produces lower AA content in the bottle preform and bottle.

The co-polyester of this invention is made from the reaction of certain monomers to prepare the polyethylene terephthalate/isophthalate (PETI). and polyethylene isophthalate (IPA). The most suitable co-polyester for use in this invention has between 90 and 99 mole % PET and 1 to 10 mole % isophthalic acid, based on the total molecular weight of the polymer. The preferred quantities of PET and IPA in the co-polymer are preferably, respectively 91.6 mole % to 96.7 mole % to 1.5 mole % to 6.6 mole % based on the total molecular weight of the polymer.

The melt phase polymerization process can be made by adding a certain quantity of terephthalic acid and isophthalic acid, or their ester derivatives, with a glycol, triol, or other multi-hydroxyl monomer. The preferred glycol is ethylene glycol. The constrained reaction conditions include a temperature of from 260° C. to 290° C., a pressure of from 70 psig (480 kPa) to <2 mm Hg (0.27 kPa) and a time of reaction of from 5 to 6 hours.

It is significant to constrain the melt polymerization reaction so that the IV range of the melt phase co-polymer is held between 0.38 dl/g to 0.52 dl/g, and preferably 0.40 dl/g to 0.50 dl/g, and most preferably at 0.46 dl/g±0.02 dl/g. It is also important that the amount of diethylene glycol content in the copolymer be 5 mole % or less. The diethylene glycol (DEG) may be prepared in-situ or it may added, but it is significant that the content be 5 mole % or less regardless of how the DEG is generated. The melt phase co-polymer (pre-polymer) will have an AA content of from 15 PPM to 45 PPM.

The molecular weight of the melt phase co-polymer is not suitable for such uses as the manufacture of beverage bottles. Thus, the melt phase copolymer must be solid state polymerized to achieve the IV necessary for bottle grade manufacture, such as an IV of 0.60 dl/g to 0.90 dl/g, typically 0.65 to 0.80 dl/g, or preferably about 0.74 dl/g.

The solid state polymerization of this invention can include a crystallization step followed by a solid phase polymerization step to elevate the co-polymer IV. The crystallization conditions include a temperature of from 100° C. to 150° C. The solid phase polymerization reactor (polycondensation) is operated at temperatures between 200° C. and 232° C. for a period of time sufficient to raise the IV to the desired level. The time may range from about 15 to 21 hours. The preferred polycondensation temperatures include a temperature of from 215° C. to 232° C. It is significant in this invention that when starting with an IV of 0.38 dl/g to 0.52 dl/g, in the melt phase, the solid phase polymerization reaction can transpire over a longer period of time, thereby reducing resin incipient AA content.

The crystallization and polymerization phase can be performed in a tumbler dryer reaction in a batch-type system or they can comprise one or more vessels in a continuous solid state process whereby the polymer flows from vessel to vessel after its predetermined treatment in those vessels.

The resins produced in this invention by the solid state polymerization process may then be converted to a preform of a bottle, which may be subjected to heat over a period of time, and is stretch-blown or blown into a bottle for ultimate consumer use. The AA content in the preform may be <1 PPM to 2.5 PPM. Preform production is conducted at a temperature of from about 245° C. to about 280° C. The bottle will possess an AA content of less than 1 μg/l (PPB). The expression IV used in this specification refers to the intrinsic viscosity as determined by measuring the viscosity of a dilute solution of the polymer using a 60/40 (w/w) phenol/tetra-chloroethane or suitable solvent system and using the Billmeyer equation to calculate the IV. This procedure is based on ASTM D-4603.

The following examples further illustrate various aspects of this invention.

EXAMPLES

The following Examples are illustrative of the invention herein claimed and are not presented as a limitation upon the scope of the claims.

Examples 1–5

The following Examples demonstrate the fact that different resin formulations result in different manufactured resin. Five resins were prepared using the mole percent of monomers as follows:

| Example | Composition (mole %) | | |
| --- | --- | --- | --- |
| | Ethylene Glycol + DEG | Isophthalic Acid | Terephthalic Acid |
| Example 1; Resin A | 96.2 + 3.8 | 0 | 100 |
| Example 2, Resin B | 98.0 + 2.0 | 2 | 98 |
| Example 3, Resin C | 97.4 + 2.6 | 2.6 | 97.4 |

-continued

| Example | Composition (mole %) | | |
|---|---|---|---|
| | Ethylene Glycol + DEG | Isophthalic Acid | Terephthalic Acid |
| Example 4, Resin D | 95.5 + 4.5 | 5 | 95 |
| Example 5, Resin E Experimental | 95.1 + 4.9 | 5 | 95 |

In Examples 4 and 5, the resins were compared to commercially available resins (Examples 1–3). The following quantities of EG (54.8 pounds) (24.9 kg), PTA (123.1 pounds) (55.8 kg) and IPA (6.6 pounds) (3.0 kg), were loaded in a batch reactor and heated for a period of 5 to 6 hours at temperature conditions of 265° C. to 283° C. A modified heel process was used in an effort to produce as low a DEG content as possible. Resins A, B, and C, were conventionally prepared using standard melt phase polymerization techniques to obtain an IV of 0.60±0.02 dl/g, resulting in a melt point of 252–253° C. For Resin D, the melt phase reaction was constrained to an IV of 0.46±0.02 dl/g and the IPA was adjusted to arrive at a melt point no greater than 245° C. For Resin E, the IV was 0.60±0.02 dl/g. Resin E was incorporated to show the effect of IV on AA content if the IV was not constrained to 0.46 dl/g, but conventionally prepared to 0.60 dl/g. The AA content in these melt phase products were as follows:

| Resin | AA Content, PPM |
|---|---|
| A | 40–60 |
| B | 40–60 |
| C | 40–50 |
| D | 26 |
| E | 49 |

Examples 6–10

In Examples 6–8, the melt phase Resins of Example 1–3 were SSP-ed at temperatures around 230–235° C. for a sufficient period of time to arrive at an IV of 0.72–0.74 dl/g. In Example 9, Resin D, was SSP-ed at 225–228° C. for 21 hours to reach 0.74 dl/g IV. In Example 10, Resin E was SSP-ed at 225° C. to 227° C. for 9 hours to reach a 0.747 dl/g IV. The resins were tested for AA content at 200° C. based on the ASTM D-4509.

The Resins were observed to have the following AA content:

| Resin | AA (ppm) |
|---|---|
| A | 1.10 |
| B | 0.48 |
| C | 0.75 |
| D | 0.24 |
| E | 1.15 |

The data supports the fact that by constraining Resin D IV to 0.46 dl/g versus Resin E IV of 0.60 dl/g yields a substantially lower AA content after SSP.

Examples 11–15

The Resins of Examples 1–5, SSP-ed in Examples 6–10, were converted to bottle preforms and bottles by the following sequence:
1. Dry applicable Resin at 150–170° C. for 8–16 hours
2. Extrusion processing of applicable Resin for injection molding of the respective preforms
3. Preform to bottle conversion by stretch-blow molding operation using Infra-Red (IR) re-heating The preform temperatures and resultant AA content, as determined in Examples 11–15, were as follows:

| | Temp (° C.) | AA (PPM) |
|---|---|---|
| Preform from Resin A | 266 | 7.5 |
| Preform from Resin B | 270 | 7.5 |
| Preform from Resin C | 269 | 8.8 |
| Preform from Resin D | 250 | 2.0 |
| Preform from Resin E | 245 | 2.3 |

Examples 16–20

The bottle preforms made in Examples 11–15 were made into 20 oz. (0.6 L) bottles at temperature and blowing conditions as follows:

| Time | Temp (° C.) | Bottle AA, µg/l |
|---|---|---|
| Preform from Resin A | 280 | 3.2 |
| Preform from Resin B | 250 | 2.4 |
| Preform from Resin C | 280 | 3.3 |
| Preform from Resin D | 250 | 0.8 |
| Preform from Resin E | 245 | 1.1 |

Even though all attempts were made, including using the lowest preform processing temperature, to suppress AA generation Resin E exceeded the 1 ug/l (PPB) maximum AA limit. Resin D, prepared from 0.46 dl/g IV melt feed resin, even when processed at 5° C. higher preform process temperature yielded a lower AA content than the 1 ug/l (PPB) AA limit.

The results of Examples 1–20 can be summarized in chart form as follows:

Resin Composition Versus Properties

| Resin | Composition (Mole %) | | | | Feed Resin (Amorphous) | | SSP Resin | | Preform Process | | Bottle (20 oz.) AA, |
|---|---|---|---|---|---|---|---|---|---|---|---|
| | EG | DEG | IPA | TPA | IV, dl/g | DSC MP, °C. | IV, dl/g | AA, PPM | Temp. °C. | AA, PPM | μg/l (PPB) |
| A | 96.2 | 3.8 | 0 | 100 | 0.60 | 252 | 0.73 | 1.10 | 266 | 7.5 | 3.2 |
| B | 98 | 2.0 | 2 | 98 | 0.60 | 252 | 0.74 | 0.48 | 270 | 7.5 | 2.4 |
| C | 97.4 | 2.6 | 2 | 98 | 0.60 | 253 | 0.72 | 0.75 | 269 | 8.8 | 3.3 |
| D | 95.5 | 4.5 | 5 | 95 | 0.46 | 243 | 0.74 | 0.24 | 250 | 2.0 | 0.8 |
| E | 95.1 | 4.9 | 5 | 95 | 0.60 | 242 | 0.74 | 1.15 | 245 | 2.3 | 1.1 |

Examples 21–24

Resins were prepared in these Examples to show the relationship of DEG content in the PET/IPA copolymer to acceptable levels of AA in a blown bottle. Four series of resins were prepared using melt polymerization where the melt reactor was constrained to produce an IV of 0.46 dl/g. The Series of Resins were made under the following formulations:
Resin
F—100-97.5/2.5 EG-TPA/IPA Copolymer. The DEG level generated is in-situ 2.2 mole % (or as low as possible). IPA content increased as necessary to achieve a maximum of 245° C. MP. 0.210 parts per thousand (PPT) antimony triacetate (Sb(Ac)$_3$ @ S/1.1, 0.001 PPT estofil blue, 0.0005 PPT estofil red, and 0.015 PPT phosphorus (P) via phosphoric acid (H$_3$PO$_4$).
G—EG-TPA/IPA Copolymer modified with the appropriate amount of IPA to achieve a maximum 245° C. MP. Target b* color, CIELab blue to yellow color index obtained on a HunterLab Color Spectrophotomer, is −2 using cobalt (Estimate 50 PPM Co). Formula is 100-96/4, EG-TPA/IPA with an IPA adjusted for a maximum 245° C. MP; 0.210 PPT Sb$_2$O$_3$ S/2.1, 0.050 PPT Co @ S/2.1; 0.045 PPT P via H$_3$PO$_4$ @ S/1.1.
H—EG/DEG -TPA/IPA Copolymer modified with one half the amount of IPA determined in Series G and the DEG is varied to achieve a maximum of 245° C. MP and a target b* color of −2 using cobalt. All the other ingredients were the same as used Resin G.
I—EG/DEG - TPA Copolymer modified with the appropriate amount of DEG to achieve a target 245° C. MP. The b* color was adjusted via cobalt.

Examples 25–29

Resins F–I were prepared in the melt phase to a melt point of 245° C. and an IV of 0.46 dl/g as performed with Resin D in the former set of Examples. During SSP of Resins F, G, H and I, the SSP was terminated when an IV of 0.74 dl/g was obtained. The AA content was determined to be 0.21–0.24 PPM at 200° C. The SSP Resins were made into bottle preforms and then blown into 20 oz. (0.6 L) bottles. The following table shows the AA content of the 20 oz. (0.6 L) bottles.

Resin Composition and Properties Versus Bottle AA Content

| Experimental Resin ID Series No. | Composition (Mole %) | | | | Feed Resin (Amorphous) | | SSP Resin | | Preform Process | | Bottle (20 oz.) |
|---|---|---|---|---|---|---|---|---|---|---|---|
| | EG | DEG | IPA | TPA | IV, dl/g | DSC MP, °C, | IV, dl/g | AA, ppm | Temp. °C. | AA, ppm | AA, μg/l |
| F | 97.5 | 2.5 | 5.5 | 94.5 | 0.46 | 245 | 0.74 | 0.21 | 250 | 2.3 | 1.0 |
| G | 96.7 | 3.3 | 4.8 | 95.2 | 0.46 | 245 | 0.74 | 0.24 | 252 | 2.3 | 1.0 |
| H | 94.1 | 5.9 | 2.3 | 97.7 | 0.46 | 245 | 0.74 | 0.22 | 250 | 2.5 | 1.2 |
| I | 92.0 | 8.0 | 0.2 | 99.8 | 0.46 | 245 | 0.74 | 0.21 | 252 | 3.9 | 1.9 |

Surprisingly, the high level of DEG content in Resins H and I could not be processed into bottles having an AA content of 1.0 μg/l (PPB) or less. It is postulated that the reduced thermal stability caused by the DEG levels of greater than 5 moles resulted in the elevated AA content in the blown preform.

What is claimed is:

1. A process to prepare a co-polymer of polyethylene terephthalate (PET), and polyethylene isophthalate (IPA) having an acetaldehyde concentration equal to or less than about 1 PPM which process comprises the steps of:
    a) reacting ethylene glycol with terephthalic acid, or its ester, and isophthalic acid, or its ester, under constrained reaction conditions effective to prepare a melt phase co-polymer having an IV in the range of 0.38 dl/g to 0.46 dl/g and a diethylene glycol content of 5 mole % or less;
    b) recovering the melt phase co-polymer from step a) as the pre-polymer used in step c); and
    c) subjecting at least a portion of the pre-polymer recovered in step b) to elevated temperatures over a period of time to elevate the IV to a range of 0.60 dl/g to 0.90 dl/g to form said co-polymer of PET and IPA having an acetaldehyde content equal to or less than 1 PPM.

2. The process of claim 1 wherein the terephthalic acid, or its ester, is present in an amount of 99 mole % to 90 mole % and the isophthalic acid, or its ester, is present in an amount of 1 mole % to 10 mole %, based on the weight of the diacids in the melt phase co-polymer.

3. The process of claim 2, where the terephthalic acid, or its ester, is present in an amount of about 95 mole % and the isophthalic acid, or its ester, is present in an amount of about 5 mole % based on the weight of the diacids in the melt phase co-polymer.

4. The process of claim 1 where the constrained reaction conditions include a temperature of from 260° C. to 290° C., a pressure of from 70 psig (480 kPa) to <2 mm (0.27 kPa) of Hg and a time of reaction of from 5 to 6 hours.

5. The process of claim 4, wherein the temperature, pressure and time are maintained to constrain the IV of the pre-polymer to a range of 0.40 dl/g to 0.50 dl/g.

6. The process of claim 5, wherein the pre-polymer contains from about 15 PPM acetaldehyde to about 45 PPM acetaldehyde.

7. The process of claim 1 wherein the pre-polymer treatment in step c) comprises a temperature of 200° C. to 232° C. over a period of time of from about 15 to about 21 hours.

8. The process of claim 7, wherein the conditions include a crystallization temperature of from 100° C. to 150° C. and a subsequent SSP temperature of 215° C. to 232° C.

9. A process to prepare a beverage container having an acetaldehyde content of 1 $\mu$g/l (PPB) or less which comprises:

a) condensing ethylene glycol with terephthalic acid, or its ester, and isophthalic acid, or its ester, under constrained reaction conditions to produce a melt phase co-polymer having an IV in the range of 0.38 dl/g to 0.46 dl/g and a diethylene glycol content of 5.0 mole % or less;

b) recovering the melt phase co-polymer from step a) as the pre-polymer used in step c);

c) subjecting at least a portion of the pre-polymer recovered in step b) to elevated temperatures over a period of time to elevate the IV and thereby form a resin co-polymer of PET and IPA having an IV of 0.60 dl/g to 0.90 dl/g and an acetaldehyde content equal to or less than 1 PPM;

d) forming a beverage container preform from said resin containing at least a portion of said resin co-polymer of PET and IPA; and e) heating and blowing said preform of step d) at conditions to form said beverage container having an AA of 1 $\mu$g/l (PPB) or less.

10. The process of claim 9, wherein the constrained reaction conditions include a temperature of from 260° C. to 290° C., a pressure of from 70 psig (480 kPa) to <2 mm of Hg (0.27 kPa) and a time of reaction of 5 to 6 hours.

11. The process of claim 9, wherein the amount of PET content in said resin co-polymer is from 91.6 mole % to 96.7 mole and the amount of IPA content is from 1.5 mole % to 6.6 mole % based on the weight of the diacids in the resin co-polymer.

12. The process of claim 9, wherein the amount of AA content in pre-polymer is 15 PPM to 45 PPM; in the preform is 1 PPM or less and the beverage container is not greater than 1 ug/l (PPB).

13. The process of claim 9, wherein the constrained reaction conditions produce a pre-polymer having DEG, added and/or in-situ generated, in an amount no greater than 5 mole % in said pre-polymer based on the diol content of the pre-polymer.

14. The beverage container made by the process of claim 9.

15. A bottle preform made from said copolymer made by the process of claim 1.

* * * * *

UNITED STATES PATENT AND TRADEMARK OFFICE
CERTIFICATE OF CORRECTION

PATENT NO. : 6,113,997
DATED : September 5, 2000
INVENTOR(S) : Massey et al.

It is certified that error appears in the above-indentified patent and that said Letters Patent is hereby corrected as shown below:

In the Claims, Column 9, Line 20, "0.50 dl/g" should read --0.46 dl/g--.

Signed and Sealed this

Fifteenth Day of May, 2001

Attest:

NICHOLAS P. GODICI

Attesting Officer     Acting Director of the United States Patent and Trademark Office